*(12)* United States Patent
Schmidt et al.

(10) Patent No.: US 11,874,201 B2
(45) Date of Patent: Jan. 16, 2024

(54) TEST FACILITY FOR CARRYING OUT A FIRE STRESS TEST ON A WATER FLOW VALVE

(71) Applicant: VdS Schadenverhütung GmbH, Cologne (DE)

(72) Inventors: Björn Schmidt, Bad Oldesloe (DE); Peter Kempf, Bad Oldesloe (DE); Georg Baumann, Bad Oldesloe (DE)

(73) Assignee: VDS SCHADENVERHUTUNG GMBH

( * ) Notice: Subject to any disclaimer, the term of this patent is extended or adjusted under 35 U.S.C. 154(b) by 492 days.

(21) Appl. No.: 17/315,485

(22) PCT Filed: Aug. 19, 2019

(86) PCT No.: PCT/EP2019/072146
§ 371 (c)(1),
(2) Date: May 10, 2021

(87) PCT Pub. No.: WO2020/094271
PCT Pub. Date: May 14, 2020

(65) Prior Publication Data
US 2022/0074821 A1    Mar. 10, 2022

(30) Foreign Application Priority Data

Nov. 8, 2018 (EP) .......................................... 205130
Dec. 19, 2018 (EP) ..................................... 18214200
Jan. 18, 2019 (EP) ..................................... 19152517

(51) Int. Cl.
*G01M 99/00* (2011.01)
*A62C 35/68* (2006.01)

(52) U.S. Cl.
CPC ........... *G01M 99/002* (2013.01); *A62C 35/68* (2013.01); *G01M 99/008* (2013.01)

(58) Field of Classification Search
CPC .... A62C 35/68; G01M 99/002; G01M 99/008
See application file for complete search history.

(56) References Cited

U.S. PATENT DOCUMENTS

| | | | | |
|---|---|---|---|---|
| 6,085,585 A | * | 7/2000 | Yu | .......................... G09B 25/04 |
| | | | | 434/226 |
| 2007/0240886 A1 | * | 10/2007 | Kil | .......................... A62C 37/50 |
| | | | | 169/39 |
| 2015/0153252 A1 | * | 6/2015 | Yu | ....................... A62C 99/0081 |
| | | | | 73/168 |

* cited by examiner

*Primary Examiner* — Randy W Gibson
(74) *Attorney, Agent, or Firm* — Edward E. Sowers; Brannon Sowers & Cracraft PC (57) ABSTRACT

The invention relates to a test method for carrying out a fire claim test on a water flow valve and/or on a water flow valve system, in particular on a wet alarm valve and/or on a wet alarm valve station, as well as technical components to be used in this context and their use.

18 Claims, 4 Drawing Sheets

TEST FACILITY FOR CARRYING OUT A FIRE STRESS TEST ON A WATER FLOW VALVE

CROSS-REFERENCES TO RELATED APPLICATIONS

This application is a National Stage filing of International Application PCT/EP 2019/072146 filed Aug. 19, 2019, entitled "Test Installation for Carrying out a Fire Stress Test on a Water Flow Valve", claiming priority to EP 18 205 130.0, filed Nov. 8, 2018, EP 18 214 200.0, filed Dec. 19, 2018, and EP 19 152 517.9, filed Jan. 18, 2019. The subject application claims priority to PCT/EP 2019/072146, EP 18 205 130.0, EP 18 214 200.0, and EP 19 152 517.9, and incorporates all by reference herein, in their entirety.

BACKGROUND OF THE INVENTION

The present invention relates to the technical field of test methods for carrying out fire stress tests on water flow systems and to corresponding components and systems for performing such test methods.

In particular, the present invention relates to a test facility for carrying out a fire stress test on a water flow valve and/or on a water flow valve system, in particular on a wet alarm valve and/or on a wet alarm valve station.

In addition, the present invention relates to a water flow valve, and more particularly to a wet alarm valve for a wet alarm valve station.

Furthermore, the present invention relates to a test system for carrying out a fire stress test comprising a test facility and at least one water flow valve and/or at least one water flow valve system, in particular a wet alarm valve and/or a wet alarm valve station.

The present invention also relates to a test method for performing a fire stress test on a water flow valve and/or on a water flow valve system, preferably on a wet alarm valve and/or on a wet alarm valve station.

Furthermore, the present invention also relates to the use of a test facility for carrying out a fire stress test on a water flow valve and/or on a water flow valve system, preferably on a wet alarm valve and/or on a wet alarm valve station.

Furthermore, the present invention relates to the use of a test system for carrying out a fire stress test on a water flow valve and/or on a water flow valve system, in particular on a wet alarm valve and/or on a wet alarm valve station.

Finally, the present invention also relates to the use of a water flow valve as a test specimen in a test system for performing a fire stress test.

Stationary or fixed fire extinguishing systems, for example sprinkler systems, are permanently operational technical systems that extinguish a fire with an extinguishing agent, for example water. They consist of a complex combination of piping systems and water discharge devices. Such systems are designed to extinguish or at least contain a fire automatically.

In the context of the present invention, the term "water flow valve" is preferably understood to mean a valve assembly which can be connected in a fluid-conducting manner between a feed line on the one hand and a discharge line on the other hand. For this purpose, the water flow valve is connected in particular directly with associated line ends to the feed line on the one hand and to the discharge line on the other hand. In particular, the water flow valve is used to shut off or control the flow of a water flow that is conducted through the pipe network connected to the water flow valve.

Particularly preferably, the water flow valve is a wet alarm valve used as a subordinate assembly in a wet alarm valve station. In this context, the water flow valve or the wet alarm valve is designed to feed further water into the pipe network of the fire extinguishing system when a sprinkler or other automatic water discharge device is triggered. On the other hand, it prevents water from flowing back. Usually, the water flow valve or wet alarm valve is installed vertically in the pipe network of the stationary fire extinguishing system.

In the context of the present invention, the term "water flow valve system" is to be understood in particular as a superordinate functional unit comprising at least one water flow valve as defined above. In addition, the water flow valve system comprises further components, for example drain valves, pressure gauges and other devices for detecting the water flow passing through the water flow valve. In particular, the water flow valve system is designed as a wet alarm valve station, which is used as a central unit or functional unit in an automatic fire extinguishing system. In addition to the wet alarm valve discussed above, such a wet alarm valve station also comprises alarm devices for issuing an acoustic and/or visual warning signal in the event of a fire. In this respect, the wet alarm valve station forms a complete or independent functional unit which, in addition to controlling the flow of water in the pipe network, also emits alarm signals in the event of a fire.

In order to ensure reliable operation of automatic fire extinguishing systems in the event of a fire, particularly high demands are placed on wet alarm valves and wet alarm valve stations. Against this background, there is a high demand for efficient test procedures and corresponding test systems in order to reliably check the requirements placed on the fire extinguishing systems. In particular, there is a great need for standardized certifications or test procedures that can be used to reliably demonstrate compliance with certain requirements.

The standard DIN EN 12259-2 specifies requirements for the design and performance of wet alarm valves. Here, a test setup is proposed in which the wet alarm valve to be tested is installed horizontally between two pipe sockets. A fuel pan is placed under the wet alarm valve to hold a fuel. To perform the fire stress test, the fuel is ignited to cause a heat effect on the wet alarm valve. At the end of the test period, the pan is removed or the fire is extinguished. After this, the wet alarm valve, which was previously exposed to the fire, is removed from the test facility and inspected for damage, such as cracks, deformations or the like.

The above-mentioned test method is disadvantageous in that the conditions prevailing in a fire extinguishing system in the event of a real fire are only inadequately represented. For example, the standard in question provides for a horizontal alignment of the water flow valve, whereas in real operation a vertical installation of the water flow valve in the fire extinguishing system is realized. It should be noted that the orientation of the water flow valve has a considerable influence on the degree of heat stress. In this respect, a horizontal orientation results in a different fire stress situation compared to a vertical orientation.

A further, likewise significant difference between the arrangement disclosed in the test method in accordance with the standard in question, DIN EN 12259-2, and the real conditions prevailing in a fire extinguishing system in the event of a fire is that a stream of water flows through the water flow valve in the event of an actual fire. In contrast, in the test arrangement in the standard at issue, only residual water is contained in the water flow valve. This can lead to a not inconsiderable falsification of the test results, since the actual load situation in a fire occurring under real conditions is only inadequately represented.

It is also important to note that under real conditions in an automatic fire extinguishing system, water is discharged immediately after the source of the fire is detected. The associated cooling effect or extinguishing effect also has an impact on the load situation of the water flow valve or the water flow valve system, which is sometimes located in the vicinity of the corresponding water discharge device. This circumstance is also not taken into account in the standard in question.

Consequently, the test method outlined above is inadequate and has disadvantages, since it does not adequately reflect the conditions prevailing in the wet alarm valve in the state in which it is used or in which it is deployed in the event of a fire and, in particular, is not suitable for checking the design requirements for non-metallic components.

In this context, it is also remarkable that the growing development of commercial areas is associated with an increased demand for automatic fire extinguishing systems, accompanied by a high number of units to be produced for the required wet alarm valves and wet alarm valve stations. In this context, the use of non-metallic components, in particular plastic parts, is sought which, due to their cost-effective and simple design, enable the economical production of water flow valves even in large quantities.

In this respect, the shortcomings described above are reflected in a particularly significant way due to the standard described above. Finally, non-metallic components or components with a low melting point of less than 800° C. behave comparatively sensitively to metallic components, so that the deviations from the real conditions are particularly pronounced.

BRIEF SUMMARY OF THE INVENTION

Against this technical background, it is an object of the present invention to provide systems and methods for carrying out fire stress tests on water flow valves and/or water flow valve systems, whereby the disadvantages of the prior art described above are to be at least largely avoided or at least mitigated.

In particular, it is an object of the present invention to provide systems and methods for carrying out fire stress tests on water flow valves and/or water flow valve systems, with which the real conditions prevailing in an actual fire are reproduced as congruently as possible.

In particular, the present invention is aimed at providing a test concept that enables reliable fire stress testing of non-metallic, in particular plastic-based, components of a water flow valve and/or a water flow valve station.

The above-mentioned object is solved by a test facility having a water flow valve, a test system described, a test method provided as well as related uses. Advantageous further developments and embodiments of the respective aspects of the invention are similarly provided.

Thus, according to a first aspect, the present invention relates to a test facility for performing a fire stress test on a water flow valve and/or on a water flow valve system, in particular on a wet alarm valve and/or on a wet alarm valve station.

Furthermore, the present invention relates—according to a second aspect of the present invention—to a water flow valve, in particular to a wet alarm valve.

Furthermore, the present invention relates—according to a third aspect of the present invention—to a test system for performing a fire stress test, wherein the test system comprises a test facility and at least one water flow valve and/or at least one water flow valve station, in particular a wet alarm valve and/or a wet alarm valve station, Similarly, the present invention relates—according to a fourth aspect of the present invention—to a test method for performing a fire stress test on a water flow valve and/or on a water flow valve system, preferably on a wet alarm valve and/or on a wet alarm valve station.

Furthermore, according to a fifth aspect of the present invention, the present invention relates to the use of a test facility for performing a fire stress test on a water flow valve and/or on a water flow valve system, preferably on a wet alarm valve and/or on a wet alarm valve station.

Also, according to a sixth aspect of the present invention, the present invention relates to the use of a test system for performing a fire stress test on a water flow valve and/or on a water flow valve system, preferably on a wet alarm valve and/or on a wet alarm valve station.

Finally, the present invention relates—according to a seventh aspect of the present invention—to the use of a water flow valve as a test specimen in a test system for performing a fire stress test.

It is understood that designs, embodiments, advantages and the like, which are mentioned below only with respect to one aspect of the invention for the purpose of avoiding repetition, apply accordingly with respect to the other aspects of the invention.

Furthermore, it is understood that in the case of the following values, figures and ranges, the ranges given are not to be understood as limiting; it is understood by the person skilled in the art that, depending on the individual case or application, it is possible to deviate from the ranges and details given without the scope of the present invention being lost.

In addition, it applies that all values or parameters or the like mentioned in the following can in principle be determined or ascertained with standardized or explicitly indicated determination methods or with determination methods familiar to the person skilled in the art.

DETAILED DESCRIPTION OF THE INVENTION

In the following, the present invention will be described in more detail.

Subject of the present invention—according to a first aspect of the present invention—is a test facility for carrying out a fire stress test on a water flow valve and/or on a water flow valve system, in particular on a wet alarm valve and/or on a wet alarm valve station, wherein the test facility comprises at least one feed line and at least one discharge line, and the test facility comprising at least one receiving means for receiving a preferably liquid fuel, it being possible for the water flow valve to be fluidically connected in a test state between a line end of the feed line, on the one hand, and a line end of the discharge line, on the other hand, and the line ends being designed and/or aligned in such a way that, in the test state, the water flow valve can be connected in a vertical installation position between the line ends.

The term "vertical installation position" is to be understood in particular as an alignment of the water flow valve which is at least substantially vertical or perpendicular to a support surface or a floor which serves in particular to support the test system. This vertical alignment may refer to the flow direction at the inlet to the water flow valve and/or at the outlet from the water flow valve and/or within the water flow valve. Alternatively or additionally, the mentioned vertical installation position or orientation may also refer to the longitudinal extension of the water flow valve, in particular of the housing of the water flow valve.

It is understood that the vertical alignment is to be understood as a practice-related value. In this respect, this value is subject to tolerances, whereby deviations from the exact perpendicular direction of preferably at most 15°, more preferably at most 10°, in particular at most 5°, may be present.

The basic idea of the present invention is thus to be seen in the vertical alignment of the water flow valve installed in the test facility, whereby the actual alignment of the water flow valve in the operational state or in real operation is mapped accordingly, since a vertical installation position is also provided here.

In addition, the vertical orientation of the water flow valve is associated with the advantage that the water flow valve—in a closed state—is securely closed due to the dead weight of a valve element of the water flow valve and/or a water column acting on the valve element. Thus, a reliable fire stress test can be carried out with a closed water flow valve, whereby the pipelines in the area of the water flow valve are completely dammed up with water, as it is also the case in real operation.

According to another alternative embodiment of this aspect, which can also be realized independently, the test facility according to the invention can be connected to a water supply system or has a water supply line, so that the water flow valve can be flowed through by a water flow in the test state and, in particular, in an open state.

The phrase "flowable through", as used in the context of the present invention, refers in particular to an open state of the water flow valve, in which a fluid inlet of the wet alarm valve on the one hand and a fluid outlet of the wet alarm valve on the other hand communicate with one another in a fluid-conducting manner, a continuous or discontinuous water flow entering the wet alarm valve via the fluid inlet and leaving the wet alarm valve again via the fluid outlet. As a result, a flow through the water flow valve takes place, in particular with the valve element being in an open or lifted position.

The basic idea of this aspect of the invention can thus be seen in the fact that the cooling effect associated with the flow of water through the wet alarm valve during real operation is taken into account. In this way, the real conditions prevailing in the event of a fire are simulated accordingly, thus enabling fire stress tests to be carried out in accordance with practical requirements.

It should be noted that the teaching according to the invention is not only aimed at the fire stress test of the water flow valve itself, but includes all components or parts that form the water flow valve system. In particular, the water flow valve is connected directly to the test facility, whereby the other components or parts of the water flow valve station are arranged on the water flow valve and are therefore also—i.e. indirectly—connected to the test facility.

According to a preferred embodiment of the test facility according to the invention, it is provided that the inlet pipe and/or the outlet pipe is/are aligned at least substantially vertically.

Particularly preferably, in this preferred embodiment, both the feed line and the discharge line are aligned vertically. In this respect, according to this particularly preferred embodiment, the feed line, the water flow valve or its housing and the discharge line form a line arrangement extending essentially vertically or having a common longitudinal direction of extension. This allows a compact structure and is further based on the arrangement that is also found under real conditions of a water flow valve installed in a fire extinguishing system.

As far as the design of the feed line and/or the discharge line is concerned, these are designed in particular to be flexural rigid or rigid and/or reinforced in the longitudinal direction. As a result, the water flow valve accommodated between the line ends is held in a fixed or secured position between the line ends of the feed line and the discharge line.

According to a preferred embodiment of the test facility, the feed line and/or the discharge line is/are designed as a pipeline or pipelines. Since conventional fire extinguishing systems also use pipes, such a design enables a closer approximation to the real conditions prevailing in the fire extinguishing system.

Preferably, the feed pipe and/or the discharge pipe is/are made of a heat- and/or fire-resistant material, in particular a metal or plastic material. The fire- and/or heat-resistant design is particularly advantageous in that a combustible is ignited during the fire stress test, as a result of which the water flow valve and the lines connected to the water flow valve are also exposed to heat. At the very least, the materials of the feed line or the discharge line must substantially heat-resistant, in particular to a temperature of at least 800° C., over the test period of preferably at least 10 minutes, in particular at least 15 minutes.

According to a further and preferred embodiment, at least one of the line ends is flange-like. This permits a secure, in particular sealing, connection of the water flow valve to the test facility. Particularly preferably, all the connecting elements in the test facility which are provided for connecting, in particular, water-carrying lines are of flange-like design.

Particularly preferably at least one of the line ends is exchangeable and/or variable in size in order to connect water flow valves of different sizes, in particular with different nominal diameters.

As far as the design of the receiving means is concerned, the latter is designed in particular to receive a liquid fuel. For this purpose, the receiving means is preferably designed as a trough- or box-shaped container. The receiving means has a capacity of at least 50 liters, preferably at least 100 liters, and particularly preferably at least 150 liters. With regard to further requirements for fuel pans, reference may be made to the US standard FM 5130. In particular, the receiving means is made of steel, especially preferably of S235 JP.

In addition, the receiving means preferably has at least one, in particular nozzle-like, drain for discharging a liquid, in particular extinguishing water, from the interior or the receiving volume of the receiving means. The drain is designed in particular in the form of a nozzle. The use of the drain prevents flooding of the receiving means as a result of the extinguishing water discharged onto the receiving means.

For this preferred embodiment, it is provided in particular that a preferably tubular, in particular siphon-like, discharge line can be connected to the drain. This permits a defined discharge of the liquid from the receiving means and thus facilitates the test operation and prevents the liquid fuel from floating up.

According to a particular embodiment of the present invention, the receiving means has at least one preferably tubular guide section via which the feed line is guided through the receiving means separately from the fuel. In this case, the feed line is guided through the guide section, whereby the feed line can be guided separately to the water flow valve from the fuel present in the interior of the receiving means. Particularly preferably, the guide section also acts as an insulating means, so that the heat of a fuel ignited in the receiving means is transferred at most in a weakened form to the fluid flowing in the feed line.

According to a further and particularly preferred embodiment, the receiving means preferably has support feet arranged at its corner regions, by means of which the receiving means is preferably supported in a height-adjustable manner on the support surface or on the floor.

A further subject of the present invention—according to a second aspect of the present invention—is a water flow valve, in particular a wet alarm valve, having at least one inlet connection for connection to a line end of a feed line and having at least one outlet connection for connection to a line end of a discharge line, wherein the water flow valve has at least one automatic water discharge device.

For the purposes of the present invention, the term "automatic water discharge device" is to be understood in particular as a technical device which is designed to initiate the discharge of water automatically or autonomously, in particular via a nozzle or a sprinkler, in the event of a fire after a certain trigger temperature has been exceeded.

The basic idea of this aspect of the invention is thus to equip the water alarm valve as such with an automatic water discharge device. Due to this design, the water flow valve according to the invention is particularly suitable for use in a test facility for carrying out a fire stress test, since a test can be realized in a particularly simple or compact design, taking into account the extinguishing effect by the water discharge device. In this respect, it is intended to couple the water discharge device fluidically with a valve housing of the water flow valve in order to ensure a replenishment of water to the water discharge device after activation of the water discharge device.

Particularly preferably, the water discharge device is designed as a sprinkler. Sprinklers are used particularly frequently in automatic fire extinguishing systems. Such sprinklers usually have sprinkler heads closed with glass ampoules filled with a colored special liquid, which in turn contains an air bubble. Within the sprinkler system, which in this case forms the superordinate fire extinguishing system, there is a constant water pressure, which can be controlled in a sprinkler control center.

In the event of a fire, the liquid in the glass ampoules heats up and expands. This causes the ampoules to burst, opening the nozzles and allowing water to escape from the sprinkler pipe network. In the event of a fire, only those sprinklers whose ampoules have reached the trigger temperature will open.

The trigger temperature depends on the size of the enclosed air bubble and is indicated by the color of the ampoule liquid. On average, the trigger temperature is approx. 30° C. above the expected room temperature.

The opening of the sprinkler or the automatic water discharge device is accompanied by a pressure drop. This pressure drop preferably initiates an at least substantially automatic opening of the water flow valve or the wet alarm valve. In particular, the valve element lifts from the valve seat due to the pressure drop, allowing further water flow through the water flow valve. From this point on, water is pumped into the sprinkler system or test facility at high pressure from tanks provided for this purpose or via a water connection dimensioned for this purpose, and is thus fed to the water supply device. This water exits at all open water nozzles or water discharge devices and extinguishes or minimizes the fire.

According to a particularly preferred embodiment, the water flow valve according to the invention is designed to convert the water flow into an electrical signal and to transmit it to at least one alarm device in order to output a corresponding alarm signal. In this way, it is also possible to check the alarm function in the event of a fire, whereby the at least one alarm device can also be part of the water flow valve according to the invention or of the higher-level water flow valve system.

Furthermore, it is preferably possible to determine the triggering location of the sprinkler or the water discharge device on the basis of the conversion of the water flow into the electrical signal.

Particularly preferably, the water flow valve comprises at least one temperature sensor in order to determine the temperature development occurring as part of the fire stress test. In principle, the temperature sensor can be arranged or fastened at any point on the water flow valve. In particular, parts of the housing are suitable for the arrangement of the temperature sensor in order to detect the temperature prevailing on the outside of the water flow valve. Alternatively or additionally, however, an arrangement in the interior or in the housing of the water flow valve is also useful in order to determine the temperature to which the components arranged in the interior of the water flow valve are exposed. Particularly preferably, at least one temperature sensor may be designed to detect the temperature of the water flow during the fire exposure test.

As a result, the water flow valve according to the invention is thus designed for specific use in the context of a fire stress test, whereby an automatically initiated extinguishing effect can be simulated in a compact manner.

A further subject of the present invention—according to a third aspect of the present invention—is a test system for carrying out a fire stress test, wherein the test system comprises a test facility and at least one water flow valve and/or at least one water flow valve system, in particular a wet alarm valve and/or a wet alarm valve station, the test facility comprising at least one feed line, at least one discharge line and at least one receiving means for receiving a preferably liquid fuel, the water flow valve being connected in a liquid-conducting manner in a test state above the receiving means between a line end of the feed line on the one hand and a line end of the discharge line on the other hand.

This test system according to the invention has at least one test facility according to the invention and at least one water flow valve according to the invention. In this way, the advantages described above can be realized accordingly.

Particularly preferably, the test system according to the invention has both the test facility equipped according to the invention and the water flow valve according to the invention. In this way, the advantages described with the components according to the invention can be realized simultaneously. Thus, the test system according to the invention makes it possible to reproduce the real conditions of a water flow valve installed in a fire extinguishing system in the operational state, whereby the design of the water flow valve according to the invention reproduces the extinguishing effect of an automatic water delivery device in a compact manner.

As far as the design of the water flow valve as a component of the test system according to the invention is concerned, it is provided in particular that the water discharge device described above is arranged and/or fastened to the water flow valve on a side facing the receiving means. In this way, water action on the receiving means for the fuel, which is arranged directly below the water flow valve, can be ensured and a particularly effective extinguishing effect simulated. In this respect, it should be noted that even with this particularly preferred design, it is still possible to check the alarm function, for example by also arranging the alarm device on the water flow valve. Then, when the water discharge device or the sprinkler is triggered, the water flow is converted into an electrical signal and the alarm device is activated accordingly by transmission of the electrical signal.

Again, a further subject of the present invention—according to a fourth aspect of the present invention—is a test method for carrying out a fire stress test on a water flow valve and/or on a water flow valve system, preferably on a wet alarm valve and/or on a wet alarm valve station, in particular using the test facility according to the present invention, wherein the following process steps are carried out,
(a) Providing a test facility which has at least one feed line and at least one discharge line,
(b) connecting the water flow valve to a line end of the feed line on the one hand and to a line end of the discharge line on the other hand,
(c) igniting a fire agent to simulate a heat effect on the water flow valve.

In accordance with the invention, the water flow valve is connected in step (b) in a vertical installation position between the line ends of the feed line on the one hand and the discharge line on the other.

In this way, the advantages already described can be realized, which lie in particular in an improved representation of the installation position of a water flow valve installed in the fire extinguishing system, accompanied by a practical fire stress test.

According to an alternative or supplementary method, which in particular can be realized independently, it is provided that the water flow valve is flowed through by a water flow during the heat exposure via the feed line.

In other words, the method according to the invention is such that the flow through the water flow valve by the water flow, on the one hand, and the heat effect due to the burning fuel, on the other hand, are superimposed over a certain period of time.

Due to the vertical orientation of the water flow valve and the cooling associated with the water flow, the test method according to the invention is particularly suitable for the realistic testing of materials that have a comparatively low melting point, for example below 800° C. The water flow valve can be used to test materials that have a low melting point.

Particularly preferably, the water flow continuously flows through the water flow valve during the heat effect. For this purpose, the test facility is connected to a water supply system or other water reservoir, in particular before the ignition of the burning agent, in order to realize the continuous supply of a water flow. By this measure, the real conditions actually prevailing in the case of fire are reproduced in a further improved manner, in particular whereby the cooling effect occurring through the water flow on the water flow valve is reproduced in a realistic manner.

Particularly preferably, the test is performed automatically, in that a water discharge device, preferably arranged on a water flow valve, is automatically triggered. This activates the water flow through the water flow valve.

In this respect, it can be provided in particular that a conversion of the water flow into an electrical signal takes place. The electrical signal is in turn used to activate an alarm device or to output an alarm signal. In this respect, the method according to the invention is also particularly suitable for checking the alarm function of an alarm device connected or connectable to the water flow valve.

According to a particularly preferred method, a continuous temperature monitoring is carried out in particular in and/or at the water flow valve. For this purpose, the temperature curve at and/or in the water flow valve is recorded via temperature sensors, preferably via thermocouples, during the exposure to heat.

An equally further subject of the present invention—according to a fifth aspect of the present invention—is the use of the test facility according to the invention for carrying out a fire exposure test on a water flow valve and/or on a water flow valve system, preferably on a wet alarm valve and/or on a wet alarm valve station.

Furthermore, the present invention relates—according to a sixth aspect of the present invention—to the use of the test system according to the present invention for performing a fire resistance test on a water flow valve and/or on a water flow valve system, preferably on a wet alarm valve and/or on a wet alarm valve station.

Finally, the present invention relates—according to a seventh aspect of the present invention—to the use of the water flow valve according to the invention in a test system as a test specimen for carrying out a fire stress test.

With the uses according to the present invention, the aforementioned advantages, as already indicated with respect to the individual components or systems according to the present invention, can be realized in a corresponding manner.

In the following, preferred embodiments of the invention are explained in more detail with reference to the drawing or figure representations. In connection with the invention of these preferred embodiments of the present invention, which are, however, in no way limiting with respect to the present invention, further advantages, properties, aspects and features of the present invention are also shown.

Figure 1:
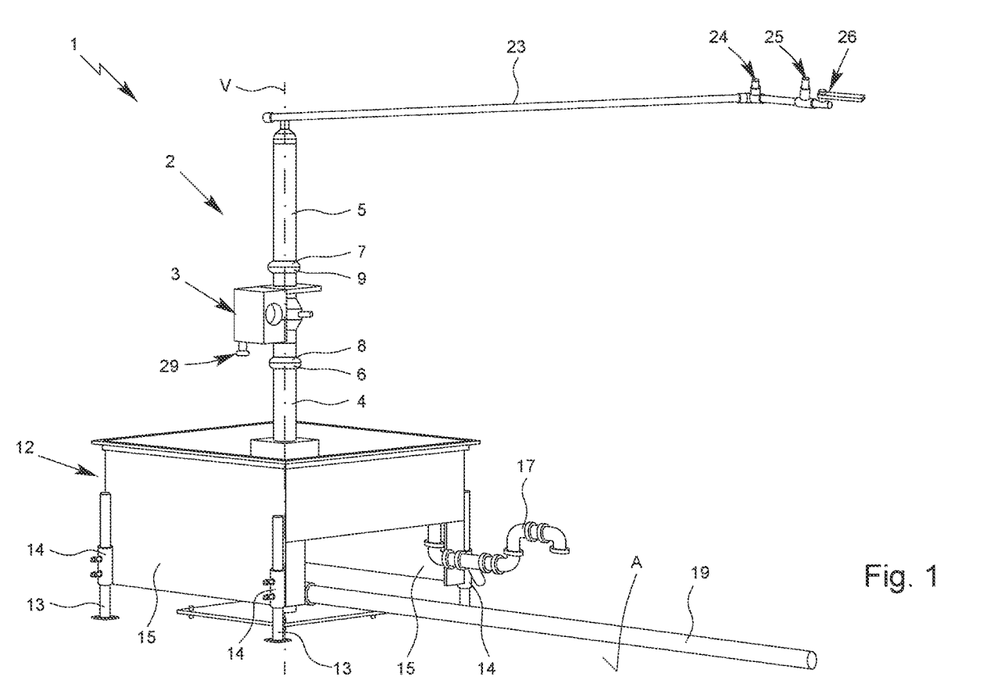
FIG. 1 provides a perspective view of a test system according to the invention, comprising a test facility according to the invention and a water flow valve according to the invention, for carrying out a fire stress test on a water flow valve and/or on a water flow valve system, in particular on a wet alarm valve and/or on a wet alarm valve station.
Figure 2:
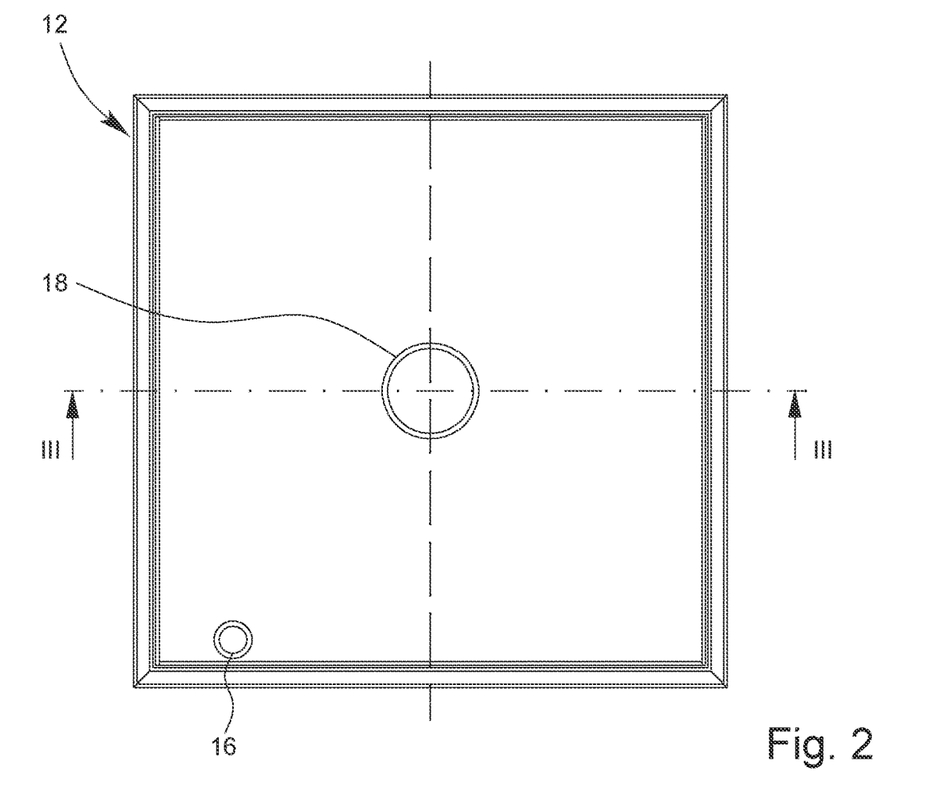
FIG. 2 provides a top view of a receiving means of the test facility according to the invention for receiving a preferably liquid fuel.
Figure 3:
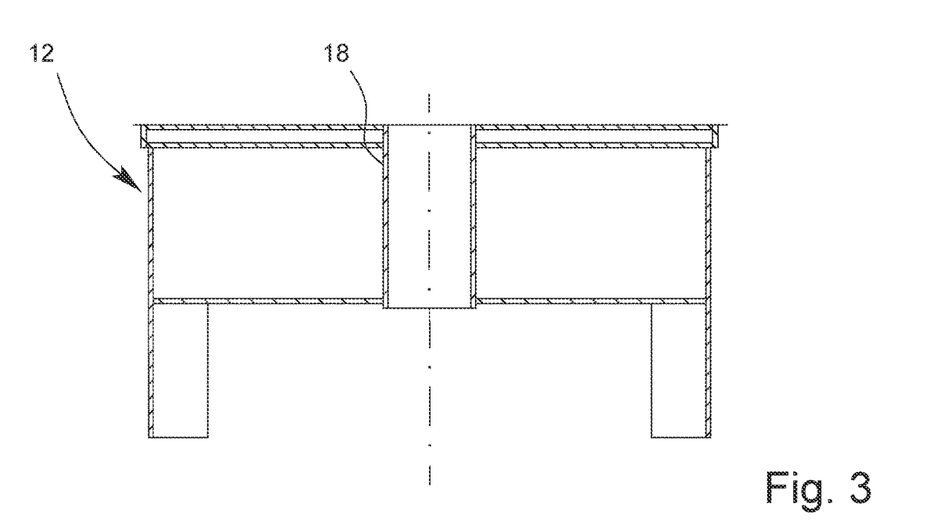
FIG. 3 provides a schematic section of the receiving means shown in FIG. 2.
Figure 4:
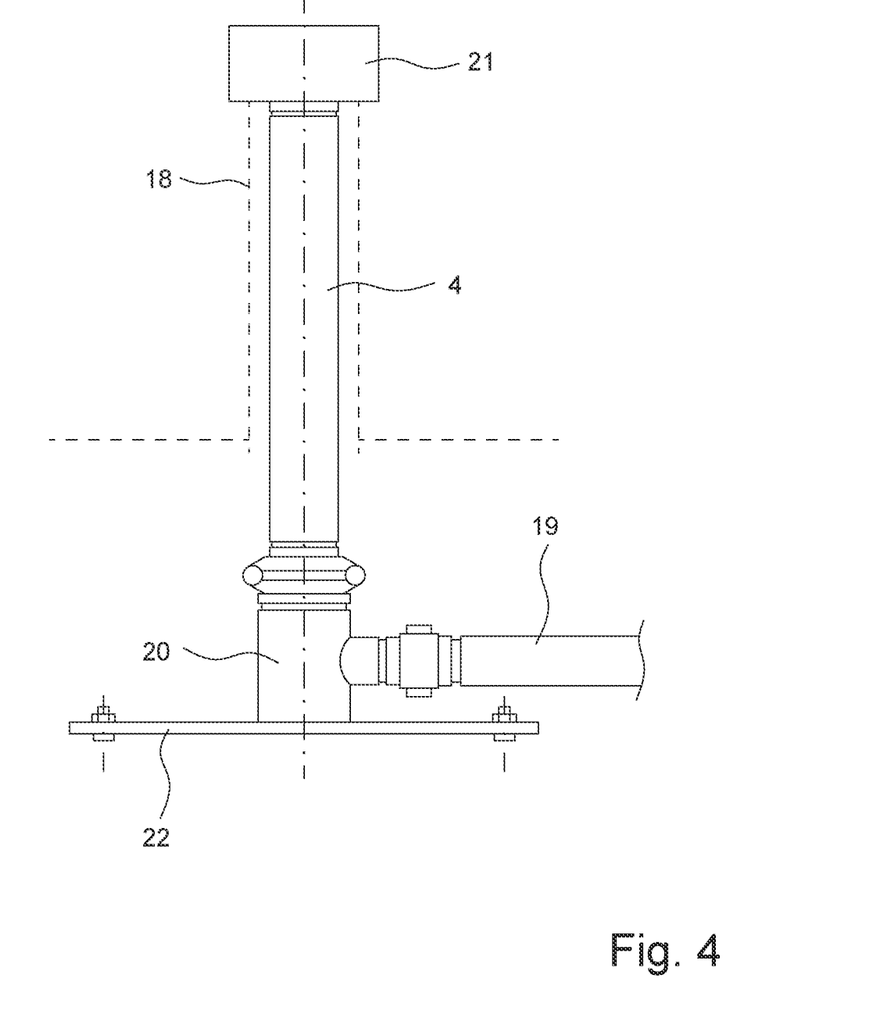
FIG. 4 provides a schematic side view of the test facility according to the invention in the connection area of a water supply line to a feed line.
Figure 5:
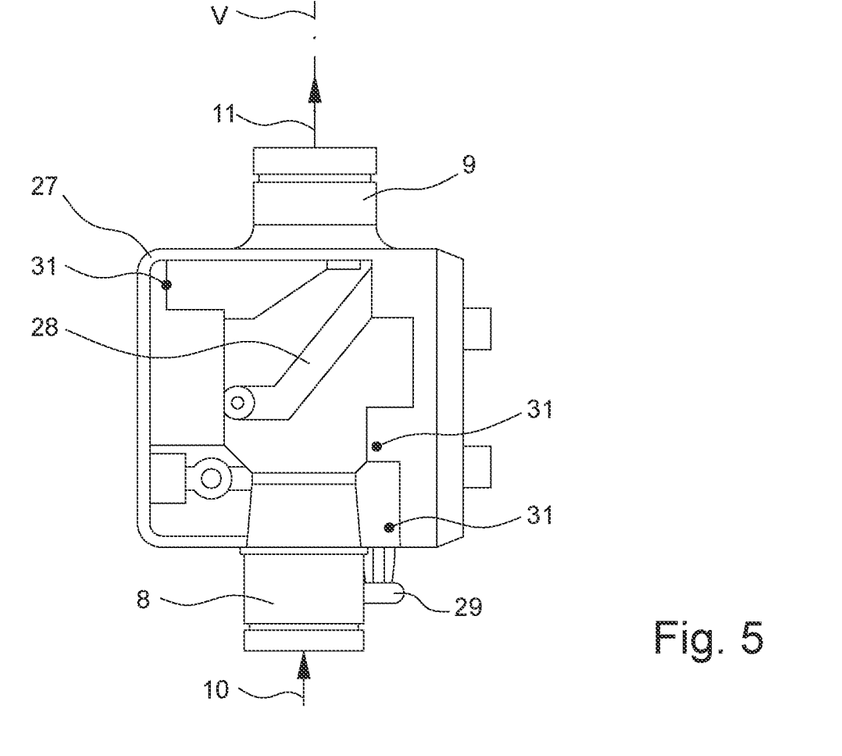
FIG. 5 provides a side view of the water flow valve according to the invention.

In the figures it shows:

FIG. 1 a perspective view of a test system according to the invention, comprising a test facility according to the invention and a water flow valve according to the invention, for carrying out a fire stress test on a water flow valve and/or on a water flow valve system, in particular on a wet alarm valve and/or on a wet alarm valve station;

FIG. 2 a top view of a receiving means of the test facility according to the invention for receiving a preferably liquid fuel;

FIG. 3 a schematic section of the receiving means shown in FIG. 2;

FIG. 4 a schematic side view of the test facility according to the invention in the connection area of a water supply line to a feed line;

FIG. 5 a side view of the water flow valve according to the invention; and

Figure 6:
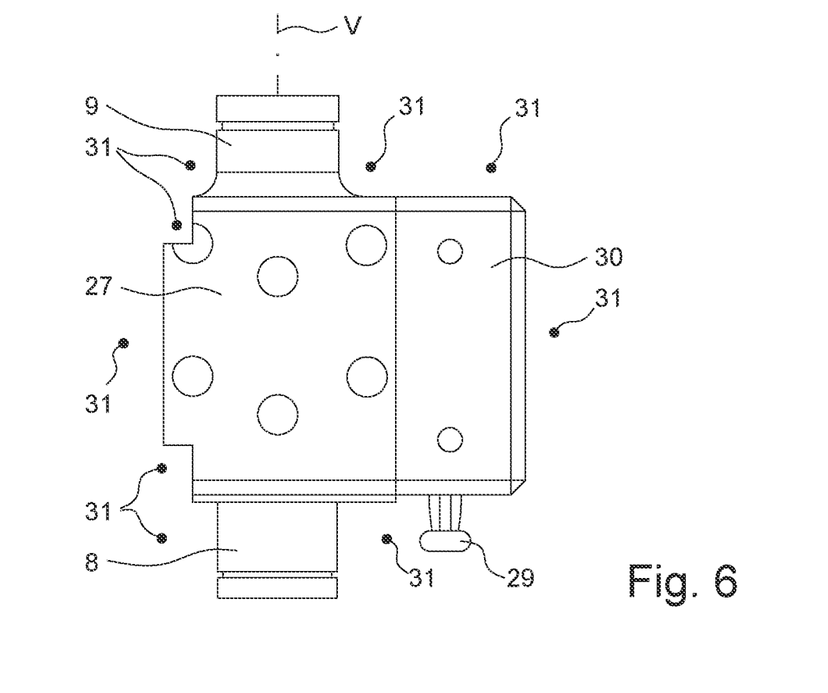
FIG. 6 provides a further side view of the water flow valve according to the invention.

FIG. 6 a further side view of the water flow valve according to the invention.

FIG. 1 illustrates a perspective view of a test system 1 according to the invention. The test system 1 comprises a test unit 2 according to the invention as a core piece and a water flow valve 3 according to the invention as a test specimen.

The water flow valve 3 is, in particular, a wet arm valve which forms part of a higher-level wet arm valve station (not shown).

The test system 1 is thus to be understood as an overall system or superordinate arrangement which, in addition to the test facility 2, also has the water flow valve 3 connected to the test facility 2.

In contrast, the test facility 2, as the core of the test system 1, forms a structural unit to which the water flow valve 3 to be tested can be connected. The connection of the water flow valve 3 to the test system 2 will be discussed in detail below.

It should be noted that the present invention is aimed at both fire exposure testing of the water flow valve 3 and fire exposure testing of a water flow valve system or a superordinate wet alarm valve station. In this respect, in addition to the water flow valve 3, all other units or components forming the wet alarm station can also be subjected to a fire stress test with the test facility 2 or the test system 1 according to the invention.

The test system 1 and/or the test facility 2 is/are designed to carry out a fire stress test on the water flow valve 3, whereby particular attention is paid to the fire stress test on non-metallic and/or low melting point components and/or sections of the water flow valve 3 and/or the water flow valve system. Components with a "low melting point" have in particular a melting point of less than 800° C., preferably less than 700° C., more preferably less than 600° C.

In principle, each component of the water flow valve 3 can be non-metallic and/or have a low melting point. In particular, the non-metallic components and/or components with a low melting point are arranged in such a way that a water flow passes through and/or around them in an operating or test state. This allows the fire stress test to be carried out taking into account a water flow acting on the components in question during the fire stress and, in particular, the associated cooling effect.

As can be seen from FIG. 1, the test system 1 or the test facility 2 is constructed or supported on a support surface A, in particular a floor.

To connect the water flow valve 3, the test system 2 has at least one feed line 4 and at least one discharge line 5. The water flow valve 3 is fluidically connected or connectable between a line end 6 of the feed line 4 on the one hand and a line end 7 of the discharge line 5 on the other hand.

In the embodiment shown, a connection element, in particular a flange, is provided at each line end 6, 7, which can be connected to corresponding, preferably also flange-like, connection elements 8, 9 of the water flow valve 3 to form the fluidic connection.

It is essential to the invention that the line ends 6, 7 are arranged and/or aligned in such a way that the water flow valve 2 is in a vertical installation position in the test state shown in FIG. 1.

The reference for the vertical installation position is a schematically indicated straight line or vertical line V, which runs essentially perpendicular to the, in particular, flat support surface A on which the test facility 2 or the test system 1 is supported. The supporting surface A is in particular the floor of a test or laboratory room.

As can be seen in particular from FIG. 5, in the test state an inflow stream 10 entering the water flow valve 3 and/or an outflow stream 11 leaving the water flow valve 3 also runs at least substantially vertically or in the direction of the vertical line V.

If the water flow valve 3 has a certain longitudinal extension, i.e. a greater length than width, the relevant longitudinal extension direction or longitudinal extension axis also runs in the vertical direction or parallel to the vertical V in order to realize the vertical installation position provided for in the invention.

In the example shown, both the feed line 4 and the discharge line 5 are aligned vertically. This results in an essentially vertical extension of the feed line 4, the water flow valve 3 and the discharge line 5 along the vertical V, as can be seen in particular from FIG. 1.

According to the invention, the water supply of the water flow valve 3 is realized via a (not shown) water supply device. This water supply device can be formed by a water tank, by means of which the test facility 2 is supplied with water. Alternatively or additionally, the test facility 2 can also be connected directly to a water supply network.

The feed line 4 and/or the discharge line 5 are preferably rigid or flexural rigid and/or otherwise reinforced in the longitudinal direction. This permits a secure or positionally fixed connection of the water flow valve 3 to the test facility 2.

In the example shown, the feed line 4 and the discharge line 5 are designed as pipelines. The pipelines can preferably consist of a metallic or other fire- or heat-resistant material. In particular, the material of the feed line 4 and/or of the discharge line 5 is at least resistant to the temperatures occurring in the course of the fire exposure, which are preferably in the range of 800° C.

The test facility 2 further has at least one receiving means 12 for receiving a (not shown) fuel or combustible. In the embodiment shown, the receiving means 12, which preferably consists of a metal material, has a trough- or box-shaped design.

In the illustrated example, the receiving means 12 comprises supporting feet 13, by means of which the receiving means 12 is supported on the supporting surface A. In particular, the support feet 13 are arranged and/or fastened to the corner regions of the receiving means 12.

For connecting the supporting feet 13 to the receiving means 12, receiving sleeves 14 are preferably also provided at the corner regions, into which the supporting feet 13 can be inserted. In this way, the support feet 13 can be adjusted as desired relative to the receiving sleeves 14 in order to realize a height adjustment of the receiving means 12 relative to the support surface A. The support feet are fastened to the receiving sleeves 14 by detachable fastening means, for example screws.

In the installed state or in the test state, the water flow valve 3 is located above the receiving means 12, with the feed line 4 passing through the receiving means 12, in particular centrally.

In addition, the receiving means 12 comprises at least two opposite extension plates 15 which, starting from an underside or a bottom of the receiving means 12, extend downward or in the direction of the support surface A.

As can now be seen from FIG. 2, the receiving means 12 has a drain 16. The drain 16 is arranged on the bottom or underside of the receiving means 12.

In particular, the drain 16 is designed in the form of a connecting piece and/or is integral with the receiving means 12.

The drain 16 permits in particular the connection of a drain device 17, in particular a siphon, in order to enable the defined drainage of liquid from the drain means 12. The drain device 17 is shown accordingly in FIG. 1.

In particular, a preferably tubular guide section 18 is provided on the receiving means 12, through which the feed line 4 is guided through the receiving means 12, as can be seen in particular in FIG. 4. The guide section 18 can be integrally formed on the receiving means 12 or form a separate component.

In order to thermally insulate the feed line 4 with respect to the receiving space of the receiving means 12, the nominal diameter of the guide section 18 is correspondingly increased with respect to the nominal diameter of the feed line 4. In particular, the nominal diameter of the guide section 18 is at least 120%, preferably at least 130%, more preferably at least 150%, of the nominal diameter of the supply line 4.

A water supply line 19 is provided for supplying water to the test system 2 in the course of the fire exposure test. The water supply line 19 is preferably designed as a pipeline and/or consists of a metallic or other heat-resistant material.

The water supply line 19 is fluidically connected to the inlet line 4. The water supply conduit 19 thereby runs substantially horizontally.

In particular, the water supply line 19 runs below the pick-up means 12 and, preferably, between the extension plates 15. A connecting piece 20, preferably in the form of a connector, T-piece, coupling piece or the like, is provided for connecting the water supply line 19 to the feed line 4.

In the illustrated and preferred embodiment example, a preferably annular support element 21 is furthermore provided, which is arranged on the guide section 18. This secures or fixes the feed line 4 relative to the guide section 18.

As can also be seen from FIG. 4, the test system 2 has a preferably plate-shaped support means 22, by means of which the feed line 4 is supported on the support surface A. In particular, the connecting piece 20 is arranged or supported on the supporting means 22.

As can be seen from FIG. 1, the discharge line 5 is fluidically connected, in particular at its axial end, to a further line 23. The further line 23 runs essentially horizontally and/or parallel to the water supply line 19. In particular, the further line 23 is also designed as a pipe and/or consists of a heat-resistant material, in particular metal and/or a heat-resistant plastic.

In particular, the further line 23 has a reduced diameter compared to the feed line 4 and/or the discharge line 5 and/or the water supply line 19.

Furthermore, at least one valve, for example a vent valve 24 and/or a safety valve 25, is provided on the further line 23. In addition, at least one ball valve 26 can be provided to drain off excess water from the test facility 2 accordingly.

In order to realize an extinguishing effect, the test facility 2 may comprise at least one (not shown) water discharge device, for example in the form of a sprinkler and/or other nozzle. In principle, the water discharge device can be arranged or provided at any point of the test facility 2. However, it is decisive that the water emerging from the water discharge device can extinguish the combustible set on fire in the receiving means 12. For example, the water discharge device can be arranged on the feed line 4 and/or on the discharge line 5 and/or on the further line 23, in particular above the receiving means 12, so that the emerging water can impinge directly on the receiving means 12.

Particularly preferred, however, is the use of the water flow valve 3 designed according to the invention, which will be discussed in detail below with reference to FIGS. 5 and 6.

The water flow valve 3 according to the invention preferably has a valve housing 27 which is equipped with the connection elements 8, 9. In particular, the valve housing 27 consists at least partially of a non-metallic material, preferably of plastic.

In the illustration according to FIG. 5, a part of the valve housing 27 has been omitted to allow a view of the interior of the valve housing 27.

It can be seen that the water flow valve 3 has a valve element 28, which in the preferred embodiment is of flap-type design. However, other technical solutions are also possible here. In the illustration shown in FIG. 5, the valve element 28 is in an open position, i.e. there is a flow of water through the water flow valve 3. In particular, the valve element 28 is biased into a closed position, in particular by means of a spring. As a result, the valve element 28 automatically resumes the closed position as soon as the water flow through the water flow valve 3 has been interrupted.

It is now essential to the invention that the water flow valve 3 itself has an automatic water discharge device 29.

Particularly preferably, the water discharge device 29 is a sprinkler. This is characterized by the fact that the water discharge is automatically triggered after a certain temperature value or a certain heat effect is exceeded. In this way, a fully automated fire stress test is made possible.

As shown in the illustrated embodiment according to FIG. 1, the water discharge device 29 is located in the test state on a side facing the receiving means 12 on the water flow valve 3.

However, it is understood that the water discharge device 21 can also be arranged on the top side or on another area on the water flow valve 3.

For the application of the water discharge device 21 to the water flow valve 3, an adapter 30 is provided in particular, which is designed for the fluidic connection of the water discharge device 29 to the wet alarm valve 3. This ensures that water is discharged via the water discharge device 29 simultaneously with the flow through the water flow valve 3.

Furthermore, the water flow valve 3 comprises at least one temperature sensor 31. The temperature sensor 31 can optionally be arranged on the valve housing 27, on the adapter 30 or on another (housing) part of the water flow valve 3. Alternatively or additionally, at least one temperature sensor 31 can be arranged inside the water flow valve 3 in order to measure the temperature development in the test condition at least one component around which and/or through which a water flow passes.

In FIGS. 5 and 6, possible arrangements of the temperature sensors 31 on and/or in the water flow valve 3 are indicated by dot-shaped highlighting.

Further embodiments, variations, modifications, particularities and advantages of the present invention are readily apparent and realizable to those skilled in the art upon reading the description, without departing from the scope of the present invention. The present invention is illustrated with reference to the following example embodiment, which is not intended to limit the present invention in any way.

Exemplary Embodiment

Performance of the Test Method According to the Invention in Accordance with a Preferred Embodiment of the Present Invention:

The test method according to the invention can be carried out according to a particular embodiment of the present invention as described below:

To carry out a fire stress test, the test facility 2 according to the invention discussed above is first provided.

The water flow valve 3 is connected to the test facility 2 as a test specimen by connecting the water flow valve 3 to the line end 6 of the feed line 4 on one side and to the discharge line end 7 of the discharge line 5 on the other side.

The ball valve 26 is closed and a water flow is introduced via the water supply line 19. The water flows into the pipe system until the pressure of the water supply and the pressure prevailing in the pipe system are balanced. In this state, the water flow valve 3 is in a closed state, for example, by supporting the fault-loaded valve element 28, which is sealingly seated on an associated valve. Consequently, when the water flow valve 3 is operational, no water flows through the water flow valve 3.

The water flow valve 3 is tested as it is installed in practice, namely in a vertical installation position.

A fuel pan with a floor area of 1 m² is used as the holding means 12. As fuel, 60l of heptane are filled into the receiving means 12. The quantity and design of the fuel is selected in such a way that a surface fire of at least 15 minutes is realized, with temperatures of at least 800° C. being present in the area of the water flow valve 3 arranged above the receiving means 12 in the event of fire.

After the area fire has been ignited, water is discharged onto the receiving means 12 or the fire ignited therein, in particular as a result of the automatic water discharge device 29, which is in particular a sprinkler. Due to the activation of the water discharge device 29 and the water supply device of the test system 2, there is now a constant flow of water through the water flow valve 3, since the previously closed valve element is now lifted relative to the valve seat to allow the water flow to be replenished.

Throughout the fire stress test, temperatures are examined at various positions in and/or on the water flow valve 3. In addition, pressure monitoring is provided at the end of the further line 23. A corresponding pressure transducer is provided for this purpose.

To prevent flooding or overflowing of liquid out of the receiving means 12, the drain 16 with the drain device 17 connected thereto is opened to ensure that the liquid flows out of the receiving means 12 on the bottom side.

As a result, the water flow valve 3 to be tested is subjected to a surface fire for at least 15 minutes as part of the fire stress test, with temperatures of approx. 800° C. occurring in the area of the water flow valve during the test.

After the fire stress test has been carried out or the surface fire has been extinguished, the water flow valve 3 subjected to the test is removed from the test system 2. Subsequently, the stressed water flow valve 3 was checked with regard to its basic functions. Particular attention was paid to the non-metallic components and/or those with a low melting point.

As a result, the test procedure described above was carried out on ten test specimens or water flow valves 3 and/or water flow valve stations. A high degree of reproducibility was found, in that the same stress marks were found on the components to be tested, in particular non-metallic components and/or components with a low melting point. This speaks for a high reproducibility of the test method according to the invention as well as of the test systems proposed in this context.

LIST OF REFERENCE SIGNS

1 Test system
2 Test facility
3 Water flow valve
4 Feed line
5 discharge line
6 Line end
7 Line end
8 Connection element
9 Connection element
10 Inlet flow
11 Outlet flow
12 Support means
13 Support foot
14 Pick-up sleeve
15 Extension plate
16 Drain
17 Drain device
18 Guide section
19 Water supply line
20 Connecting piece
21 Support element
22 Support means
23 Further line
24 Vent valve
25 Safety valve
26 Ball valve
27 Valve housing
28 Valve element
29 Water discharge device
30 Adapter
31 Temperature sensor

The invention claimed is:

1. A test facility for carrying out a fire stress test on at least one of a water flow valve and a water flow valve system,
   wherein the test facility comprises at least one feed line and at least one discharge line, and
   wherein the test facility comprises at least one receiving means for receiving a liquid fuel,
   wherein the receiving means is designed in the shape of a trough or box,
   wherein the water flow valve is fluidically connectable in a test state between a line end of the feed line, on the one hand, and a line end of the discharge line, on the other hand,
   wherein the line ends are designed and aligned in such a way that the water flow valve is connectable in a vertical installation position between the line ends in the test state,
   wherein the feed line and the discharge line are aligned at least substantially vertically,
   wherein the test facility is connectable to a water supply device or comprises a water supply device, so that a water flow can flow through the water flow valve in the test state, and wherein the receiving means comprises at least one tubular guide section via which the feed line, separate from the fuel, is guided through the receiving means.

2. The test facility according to claim 1,
wherein the feed line and the discharge line are reinforced in the longitudinal direction; and
wherein the feed line and the discharge line are each designed as a pipeline.

3. The test facility according to claim 1,
wherein the feed line and the discharge line are made of a heat and fire-resistant material.

4. The test facility according to claim 1,
wherein at least one of the line ends is of flange-like design.

5. The test facility according to claim 1,
wherein at least one nozzle-like drain is provided on the receiving means for discharging a liquid from the interior of the receiving means, wherein a tubular drainline is connectable to the drain.

6. The test facility according to claim 1,
wherein the receiving means comprises a support feet arranged at corner regions of the receiving means, via which the receiving means is supported in a height-adjustable manner.

7. A test system for carrying out a fire stress test, wherein the test system comprises a test facility as well as at least one of one or more water flow valves and at least one water flow valve system,
wherein the test facility comprises at least one feed line, at least one discharge line and at least one receiving means for receiving a liquid fuel,
wherein the water flow valve is fluidically connected in a test state between a line end of the feed line, on the one hand, and a line end of the discharge line, on the other hand,
wherein the test facility is designed according to claim 1.

8. The test system according to claim 7,
wherein the water discharge device is arranged and fastened to the water flow valve on a side facing the receiving means.

9. The test system according to claim 7,
wherein the water flow valve comprises at least one automatic water discharge device.

10. The test system according to claim 9,
wherein the water discharge device is designed as a sprinkler; and
wherein the water flow valve has at least one temperature sensor.

11. The test system according to claim 10,
wherein the temperature sensor is a thermocouple.

12. A test method for carrying out a fire stress test on at least one of a water flow valve and on a water flow valve system, wherein the test method comprises using a test facility according to claim 1,
wherein the following method steps are carried out:
(a) providing the test facility which comprises at least the feed line and at least the discharge line,
(b) connecting the water flow valve to the line end of the feed line, on the one hand, and to the line end of the discharge line, on the other hand,
(c) igniting a fire agent to cause a heat effect on the water flow valve,
wherein the water flow valve is connected in step (b) in a vertical installation position between the line ends of the feed line, on the one hand, and the discharge line, on the other hand, and
wherein the water flow valve is flowed through by a water flow during the heat exposure.

13. The test method according to claim 12,
wherein the water flow valve is continuously flowed through by the water flow during the heat exposure.

14. The test method according to claim 12,
wherein an automatic water discharge device is provided, which is triggered as a result of the heat action after a certain trigger temperature has been exceeded, in order to bring about a discharge of water onto the ignited fire medium.

15. The test method according to claim 14,
wherein the water flow through the water flow valve is introduced and initiated by the triggering of the water discharge device.

16. The test method according to claim 12,
wherein during the heat exposure the temperature course at and in the water flow valve is recorded via thermocouples.

17. A method for carrying out a fire stress test on at least one of a water flow valve and a water flow valve system,
wherein the method comprises the step of using a test facility according to claim 1.

18. A method for carrying out a fire stress test on at least one of a water flow valve and a water flow valve system,
wherein the method comprises the step of using a test system according to claim 7.

* * * * *